United States Patent
Kato et al.

(10) Patent No.: US 8,660,762 B2
(45) Date of Patent: Feb. 25, 2014

(54) AUTOMATIC TRANSMISSION AND PROTECTION METHOD THEREOF

(75) Inventors: Nobuhide Kato, Okazaki (JP);
Nobuhiko Morifuji, Okazaki (JP);
Toyotaro Yoshida, Kobe (JP);
Toshimitsu Yamamoto, Kobe (JP)

(73) Assignees: Jatco Ltd, Fuji-shi (JP); Mitsubishi Electric Corporation, Tokyo (JP)

( * ) Notice: Subject to any disclaimer, the term of this patent is extended or adjusted under 35 U.S.C. 154(b) by 532 days.

(21) Appl. No.: 12/909,598

(22) Filed: Oct. 21, 2010

(65) Prior Publication Data

US 2011/0098896 A1    Apr. 28, 2011

(30) Foreign Application Priority Data

Oct. 27, 2009    (JP) ................... 2009-246484

(51) Int. Cl.
*F16H 59/72*    (2006.01)
*F16H 61/14*    (2006.01)

(52) U.S. Cl.
USPC ............................................. 701/53; 701/60

(58) Field of Classification Search
USPC .......... 701/51, 53–56, 58, 60, 65; 477/72, 76, 477/97, 98
See application file for complete search history.

(56) References Cited

U.S. PATENT DOCUMENTS

| | | | | |
|---|---|---|---|---|
| 5,069,084 A | * | 12/1991 | Matsuno et al. | 477/61 |
| 5,319,963 A | * | 6/1994 | Benford | 73/115.02 |
| 5,676,619 A | * | 10/1997 | Ohashi et al. | 477/98 |
| 6,285,940 B1 | * | 9/2001 | Henneken et al. | 701/55 |
| 6,314,356 B1 | * | 11/2001 | Schmid et al. | 701/51 |
| 7,644,793 B2 | * | 1/2010 | Iwasaki et al. | 180/68.2 |
| 2008/0033618 A1 | * | 2/2008 | Kwon | 701/54 |
| 2009/0118953 A1 | * | 5/2009 | Nakamura et al. | 701/60 |
| 2010/0126438 A1 | * | 5/2010 | Kim | 123/41.21 |
| 2010/0286878 A1 | * | 11/2010 | Lindgren et al. | 701/54 |

FOREIGN PATENT DOCUMENTS

| | | |
|---|---|---|
| DE | 103 25 666 A1 | 12/2004 |
| JP | 63-176850 A | 7/1988 |
| JP | 02-096068 U | 7/1990 |
| JP | 07-174223 A | 7/1995 |
| JP | 11-063207 A | 3/1999 |

* cited by examiner

*Primary Examiner* — Jason Holloway
(74) *Attorney, Agent, or Firm* — Foley & Lardner LLP

(57) ABSTRACT

When temperature increase promotion processing (for example, prohibiting lockup application and prohibiting shifts to a high gear position) is started while an initial value of an ATF temperature is in a low temperature region, an ATCU determines whether to terminate the temperature increase promotion processing on the basis of a current ATF temperature, and when the temperature increase promotion processing is started while the initial value of the ATF temperature is in an extremely low temperature region, the ATCU determines whether to terminate the temperature increase promotion processing on the basis of a duration of the temperature increase promotion processing. When the temperature increase promotion processing is determined to be complete, the ATCU terminates the temperature increase promotion processing.

6 Claims, 4 Drawing Sheets

AUTOMATIC TRANSMISSION AND PROTECTION METHOD THEREOF

FIELD OF THE INVENTION

This invention relates to control of an automatic transmission, and more particularly to protection control of an automatic transmission at an extremely low temperature.

BACKGROUND OF THE INVENTION

When an outside air temperature is low, leading to a reduction in the temperature of a working oil (to be referred to as "ATF" hereafter) of an automatic transmission, a viscosity of the working oil increases, causing delays in the engagement/disengagement of frictional engagement elements that contribute to shifts, such as clutches and brakes. As a result, shift shock and shift delays occur.

To prevent this, JP2-96068U discloses a technique of prohibiting shifts to a highest gear position at a low temperature and waiting for a predetermined time to elapse following engine startup before canceling the prohibition of shifts to the highest gear position. According to this technique, by prohibiting shifts to the highest gear position, a rotation speed of the engine is maintained at a higher speed than when shifts to the highest gear position are not prohibited, and therefore increases occur in an amount of ATF stir in a torque converter and a rotation speed of a pump for circulating the ATF. As a result, an increase in the temperature of the ATF can be promoted.

JP7-174223A discloses, with a similar aim, a technique of prohibiting engagement of a lockup clutch (also known as a damper clutch) provided in a torque converter at a low temperature until a cumulative value of an engine rotation speed exceeds a predetermined value. According to this technique, the ATF continues to be stirred in the torque converter, and therefore an increase in the temperature of the ATF can be promoted.

SUMMARY OF THE INVENTION

When the temperature of the ATF falls further so as to enter an extremely low temperature region, the ATF accumulates in a cooler hose connecting an ATF cooler to the automatic transmission and cannot be supplied sufficiently to the automatic transmission from the ATF cooler. Possible reasons for this are that the temperature reduction causes a fluidity of the ATF in the cooler hose to decrease dramatically, the temperature reduction causes the cooler hose to freeze and contract, and so on. When an insufficient amount of ATF is supplied to the automatic transmission, seizure and breakage may occur in the frictional engagement elements and rotary elements.

However, the ATF temperature increase promotion processing according to the prior art described above is performed with the aim of avoiding activation delays in the friction engagement elements at a low temperature. A predetermined time and a predetermined value used to determine whether or not to terminate the temperature increase promotion processing are set at values required to achieve this aim, and therefore, when the temperature increase promotion processing is applied without modification at an extremely low temperature, the temperature increase promotion processing may be terminated before the temperature of the ATF has risen sufficiently.

Further, when the temperature is extremely low such that the ATF cannot be supplied to the automatic transmission from the ATF cooler, only the temperature of the ATF in the automatic transmission rises, and therefore, if a method of determining completion of the temperature increase promotion processing on the basis of the temperature of the ATF is employed, completion cannot be determined appropriately.

An object of this invention is to protect an automatic transmission by increasing the temperature of a working oil in the automatic transmission appropriately even at an extremely low temperature.

According to an aspect of this invention, an automatic transmission that has a heat exchanger for cooling a working oil and receives a supply of the working oil from the heat exchanger includes a working oil temperature sensor which obtains a temperature of the working oil in the automatic transmission; a temperature increase promotion processing starting unit which starts temperature increase promotion processing to promote an increase in the temperature of the working oil when an initial value of the temperature of the working oil obtained by the working oil temperature sensor is in a low temperature region, in which a viscosity of the working oil rises such that activation of a frictional engagement element in the automatic transmission is delayed, or an extremely low temperature region, which is a lower temperature region than the low temperature region, in which the viscosity of the working oil rises further such that the working oil is not supplied sufficiently from the heat exchanger to the automatic transmission; and a temperature increase promotion processing terminating unit which determines whether the temperature increase promotion processing is complete on the basis of a current temperature of the working oil obtained by the working oil temperature sensor in a case where the temperature increase promotion processing is started while the initial value of the temperature of the working oil is in the low temperature region, determines whether the temperature increase promotion processing is complete on the basis of a duration of the temperature increase promotion processing in a case where the temperature increase promotion processing is started while the initial value of the temperature of the working oil is in the extremely low temperature region, and terminates the temperature increase promotion processing when the temperature increase promotion processing is determined to be complete.

According to another aspect of this invention, a protection method for an automatic transmission that has a heat exchanger for cooling a working oil and receives a supply of the working oil from the heat exchanger includes starting temperature increase promotion processing to promote an increase in a temperature of the working oil when an initial value of the temperature of the working oil is in a low temperature region, in which a viscosity of the working oil rises such that activation of a frictional engagement element in the automatic transmission is delayed, or an extremely low temperature region, which is a lower temperature region than the low temperature region, in which the viscosity of the working oil rises further such that the working oil is not supplied sufficiently from the heat exchanger to the automatic transmission; and determining whether the temperature increase promotion processing is complete on the basis of a current temperature of the working oil in a case where the temperature increase promotion processing is started while the initial value of the temperature of the working oil is in the low temperature region, determining whether the temperature increase promotion processing is complete on the basis of a duration of the temperature increase promotion processing in a case where the temperature increase promotion processing is started while the initial value of the temperature of the working oil is in the extremely low temperature region, and terminating the temperature increase promotion processing when the temperature increase promotion processing is determined to be complete.

According to these aspects, the working oil temperature increase promotion processing is performed for a required amount of time even at an extremely low temperature, and therefore seizure and breakage of frictional engagement elements and rotary elements due to insufficient lubrication of the automatic transmission can be prevented, thereby protecting the automatic transmission.

Embodiments and advantages of this invention will be described in detail below with reference to the attached figures.

DESCRIPTION OF THE PREFERRED EMBODIMENTS

Figure 1:
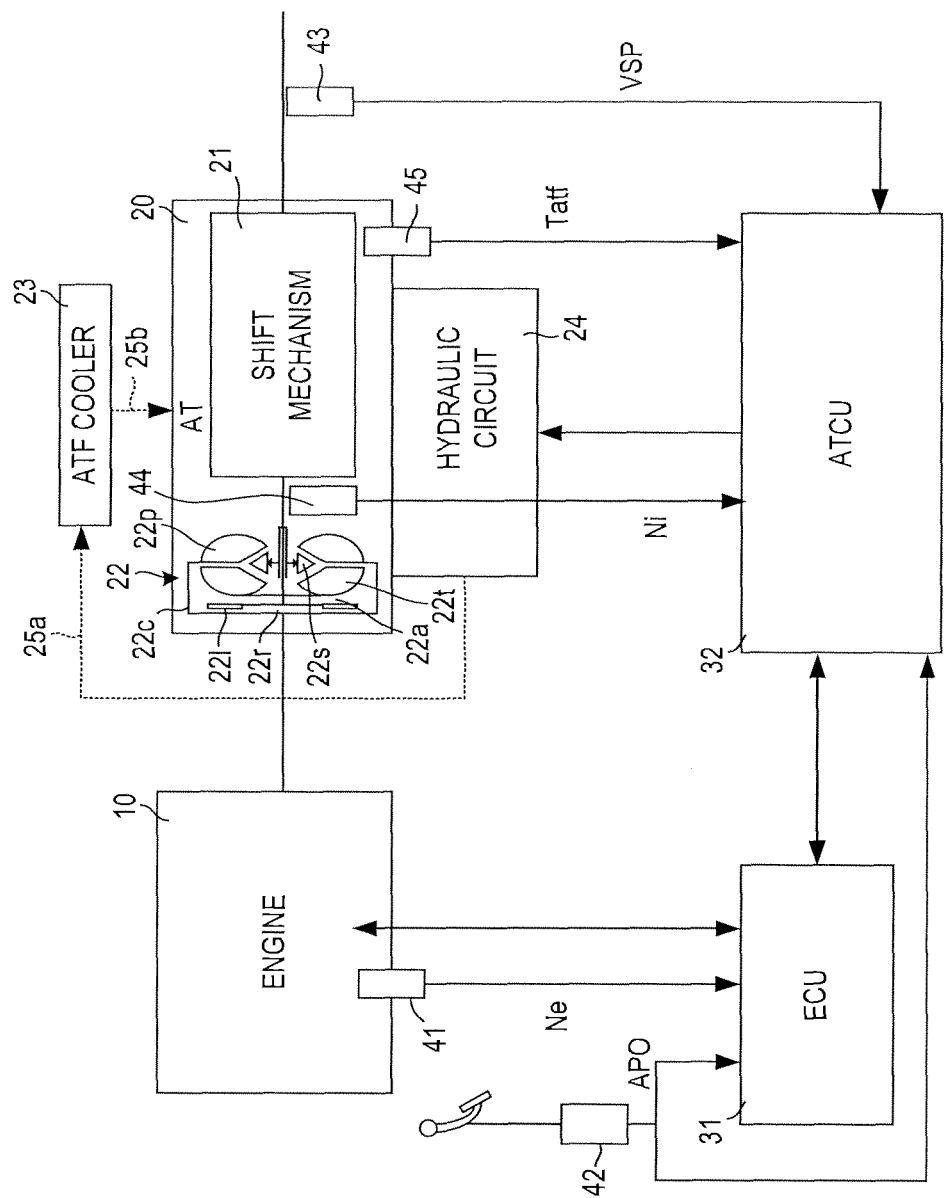
FIG. 1 is a schematic diagram showing the constitution of a vehicle including an automatic transmission according to an embodiment of this invention.

FIG. 1 shows an outline of the constitution of a vehicle including an automatic transmission according to an embodiment of this invention. The vehicle comprises an engine 10 and an automatic transmission (AT) 20. An output rotation of the engine 10 is varied by the automatic transmission 20 and then transmitted to drive wheels, not shown in the figure.

The automatic transmission 20 comprises a shift mechanism 21 and a torque converter 22. The shift mechanism 21 is a step shift mechanism constituted by a plurality of planetary gears, a plurality of frictional engagement elements (clutches, brakes), and so on and having first to seventh forward gear positions and a reverse gear position, for example. The automatic transmission 20 realizes a desired gear position by engaging the frictional engagement elements selectively.

The automatic transmission 20 includes an ATF cooler 23. The ATF cooler 23 is a heat exchanger that cools an ATF (automatic transmission fluid) serving as a working oil of the automatic transmission 20 through heat exchange with outside air. The ATF cooler 23 is connected to a hydraulic circuit 24, to be described below, by a cooler hose 25a and connected to the automatic transmission 20 by a cooler hose 25b. The cooled ATF is supplied to the automatic transmission 20 from the ATF cooler 23.

A torque converter 22 comprises a casing 22c coupled to an output shaft of the engine 10, a pump impeller 22p coupled to the casing 22c, a turbine runner 22t coupled to an input shaft of the shift mechanism 21, a stator 22s disposed between the pump impeller 22p and the turbine runner 22t, and a lockup clutch 221 coupled to the turbine runner 22t. The lockup clutch 221 is also known as a "damper clutch", and is disengaged when a release pressure Pr is supplied to an oil chamber 22r formed between the casing 22c and the lockup clutch 221 and engaged when an apply pressure Pa is supplied to an oil chamber 22a formed between the lockup clutch 221 and the turbine runner 22t. In the following description, where appropriate, engagement of the lockup clutch 221 will be referred to as "lockup" and disengagement thereof will be referred to as "un-lockup".

When un-lockup is performed, the torque converter 22 generates a torque amplification action whereby torque input from the engine 10 is amplified and then output to the shift mechanism 21. When lockup is performed, the pump impeller 22p and the turbine runner 22t are directly coupled such that loss caused by slippage of the torque converter 22 is eliminated.

The lockup clutch 221 and the frictional engagement elements constituting the shift mechanism 21 are engaged and disengaged by switching an oil pressure supplied from the hydraulic circuit 24, which is constituted by a plurality of spool valves and a plurality of solenoid valves.

A control system of the vehicle is constituted by an engine control unit (to be referred to as hereafter as an "ECU") 31 that controls the engine 10 and a transmission control unit (to be referred to as hereafter as an "ATCU") 32 that controls the automatic transmission 20. The ECU 31 and the ATCU 32 both include a CPU, a memory, and an input/output interface. The ECU 31 and the ATCU 32 are connected to each other in order to exchange necessary information.

A rotation speed Ne of the engine 10 detected by an engine rotation speed sensor 41, an accelerator pedal operation amount APO detected by an accelerator operation amount sensor 42, and so on are input into the ECU 31. The ECU 31 controls the engine 10 on the basis of these input signals. For example, the ECU 31 calculates a target engine torque on the basis of the rotation speed Ne of the engine 10 and the accelerator pedal operation amount APO and then controls a throttle opening, a fuel injection amount, a fuel injection timing, and an ignition timing of the engine 10 such that the calculated target engine torque is realized.

A vehicle speed VSP detected by a vehicle speed sensor 43, an input rotation speed Ni of the automatic transmission 20 (=an output rotation speed of the torque converter 22) detected by an input rotation speed sensor 44, a temperature Tatf of the ATF in the automatic transmission 20 (more specifically, the ATF that is suctioned from an oil pan by an oil pump) detected by an ATF temperature sensor 45, and the accelerator pedal operation amount APO detected by the accelerator operation amount sensor 42 are input into the ATCU 32. The ATCU 32 refers to a shift map, not shown in the figures, to determine whether or not lockup can be performed on the basis of a comparison result between the vehicle speed VSP and a lockup vehicle speed set on the shift map (for example, the ATCU 32 determines that lockup is permitted when the vehicle speed VSP is equal to or higher than a lockup vehicle speed of 5 km/h), and performs lockup or un-lockup in accordance with the determination result. The ATCU 32 also refers to the shift map to determine a target gear position on the basis of the vehicle speed VSP and the accelerator pedal operation amount APO and engages the frictional engagement elements of the shift mechanism 21 selectively such that the target gear position is realized.

Lockup will now be described in further detail.

Figure 2A:
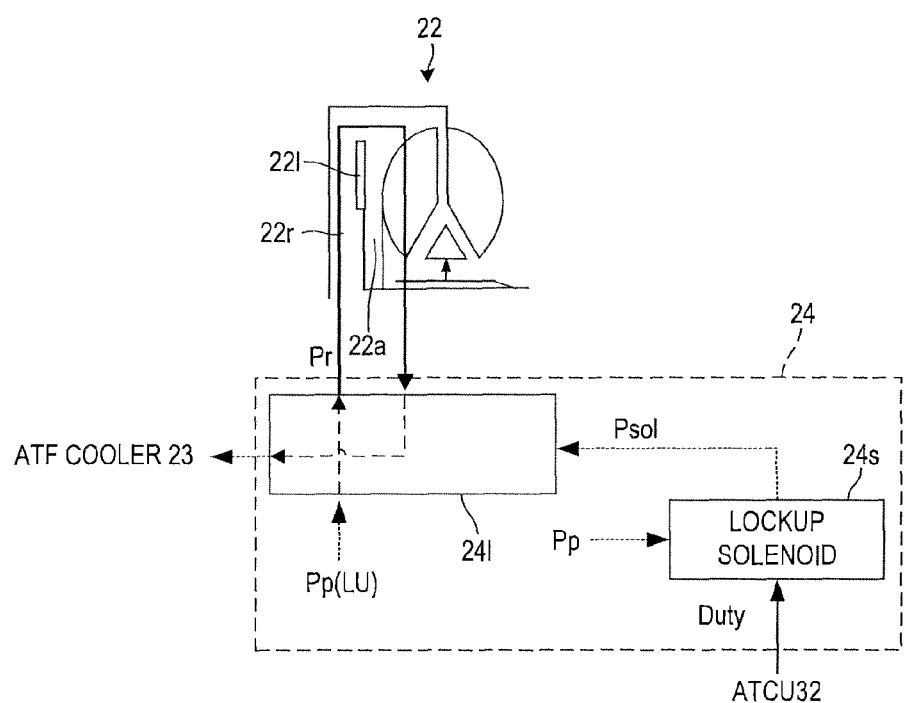
FIG. 2A is an illustrative view illustrating an un-lockup condition.
Figure 2B:
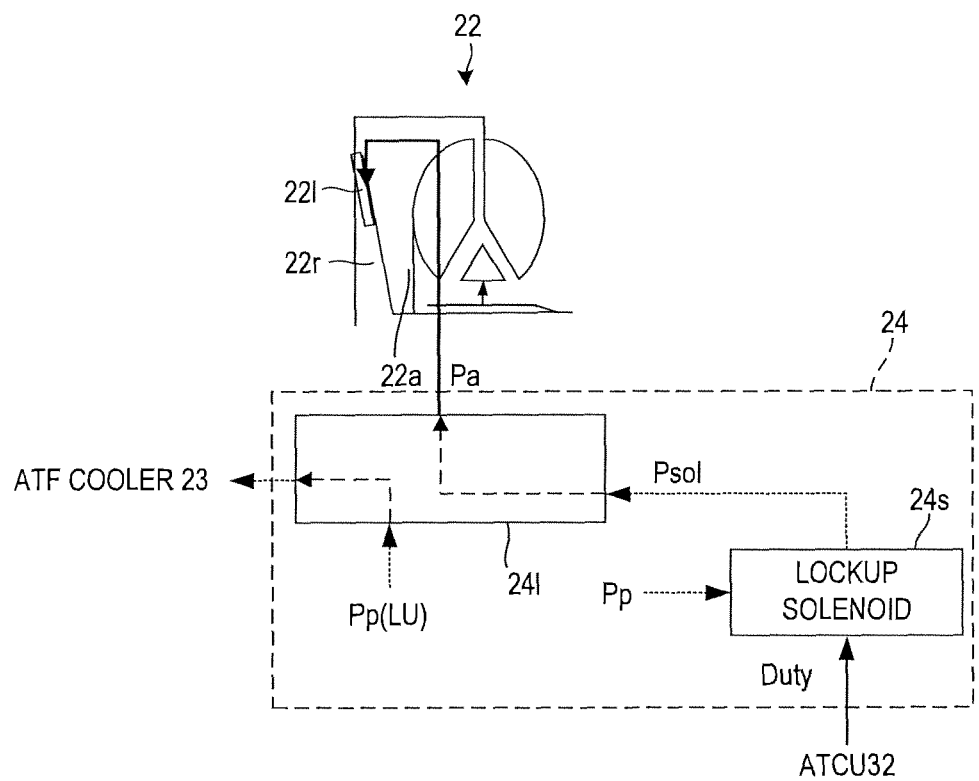
FIG. 2B is an illustrative view illustrating a lockup condition.

FIG. 2A shows an un-lockup condition and FIG. 2B shows a lockup condition. Either one of the apply pressure Pa and the release pressure Pr is supplied to the lockup clutch 221 via a lockup hydraulic circuit 241 provided in the hydraulic circuit 24.

First, referring to FIG. 2A, the un-lockup condition will be described. To establish the un-lockup condition by disengaging the lockup clutch 221, a solenoid pressure Psol supplied to the lockup hydraulic circuit 241 from a lockup solenoid 24s is set at zero by setting a duty ratio Duty transmitted to the lockup solenoid 24s from the ATCU 32 at zero. As a result, a pump pressure Pp is introduced into the oil chamber 22r as the release pressure Pr, whereby the lockup clutch 221 is disengaged. The introduced release pressure Pr is then discharged to the exterior of the torque converter 22 via the oil chamber 22a and transmitted to the ATF cooler 23 via the lockup hydraulic circuit 241.

Next, referring to FIG. 2B, the lockup condition will be described. To establish the lockup condition by engaging the lockup clutch 221, the solenoid pressure Psol is raised to a predetermined pressure by increasing the duty ratio Duty transmitted to the lockup solenoid 24s from the ATCU 32. As a result, a flow passage through the lockup hydraulic circuit 241 is switched such that the solenoid pressure Psol is introduced into the oil chamber 22a as the apply pressure Pa, whereby the lockup clutch 221 is engaged.

The lockup clutch 221 is engaged and disengaged in accordance with the shift map, as described above, but when the temperature Tatf of the ATF is low such that a viscosity thereof is high, engagement/disengagement of the frictional engagement elements is delayed, leading to shift shock and shift delays. Hence, the ATCU 32 monitors the ATF temperature Tatf and promotes a temperature increase in the ATF (performs ATF temperature increase promotion processing) by prohibiting lockup until the ATF temperature Tatf rises to a predetermined temperature TC (a value between 35° C. and 45° C., for example) at which activation delays in the frictional engagement elements no longer occur. When lockup is prohibited, the ATF in the torque converter 22 continues to be stirred, and therefore an increase in the temperature of the ATF can be promoted.

However, simply by performing this temperature increase promotion processing at a low temperature, it is impossible to respond sufficiently to extremely low temperatures at which the ATF temperature Tatf falls even further. The reason for this is as follows.

At an extremely low temperature, the ATF stops circulating between the ATF cooler 23 and the automatic transmission 20 due to a dramatic reduction in the fluidity of the ATF in the cooler hoses 25a, 25b, contraction of the frozen cooler hoses 25a, 25b, and so on, and therefore only the temperature of the ATF in the automatic transmission 20 increases. Hence, even though the ATF temperature Tad rises sufficiently, extremely low-temperature ATF may remain in the ATF cooler 23 and the cooler hoses 25a, 25b, and it is therefore impossible to determine a correct timing for terminating the temperature increase promotion processing using a method of determining completion of the temperature increase promotion processing based on the ATF temperature Tatf. If the temperature increase promotion processing is terminated while extremely low-temperature ATF remains in the ATF cooler 23 and so on, a larger amount of time is required to restore ATF circulation between the ATF cooler 23 and the automatic transmission 20, and as a result, seizure or breakage of the frictional engagement elements or rotary elements may occur.

In response to this problem, the ATCU 32 applies different temperature increase promotion processing termination conditions at a low temperature and an extremely low temperature such that the ATF temperature increase promotion processing is performed for a required amount of time at both low and extremely low temperatures. Furthermore, at an extremely low temperature, not only lockup but also shifts to a high gear position are prohibited. As a result, the rotation speed Ne of the engine 10 is maintained at a higher speed than when such shifts are not prohibited, and therefore increases in the amount of ATF stir in the torque converter 22 and the rotation speed of a pump for circulating the ATF can be achieved, enabling further promotion of an increase in the ATF temperature.

Figure 3:
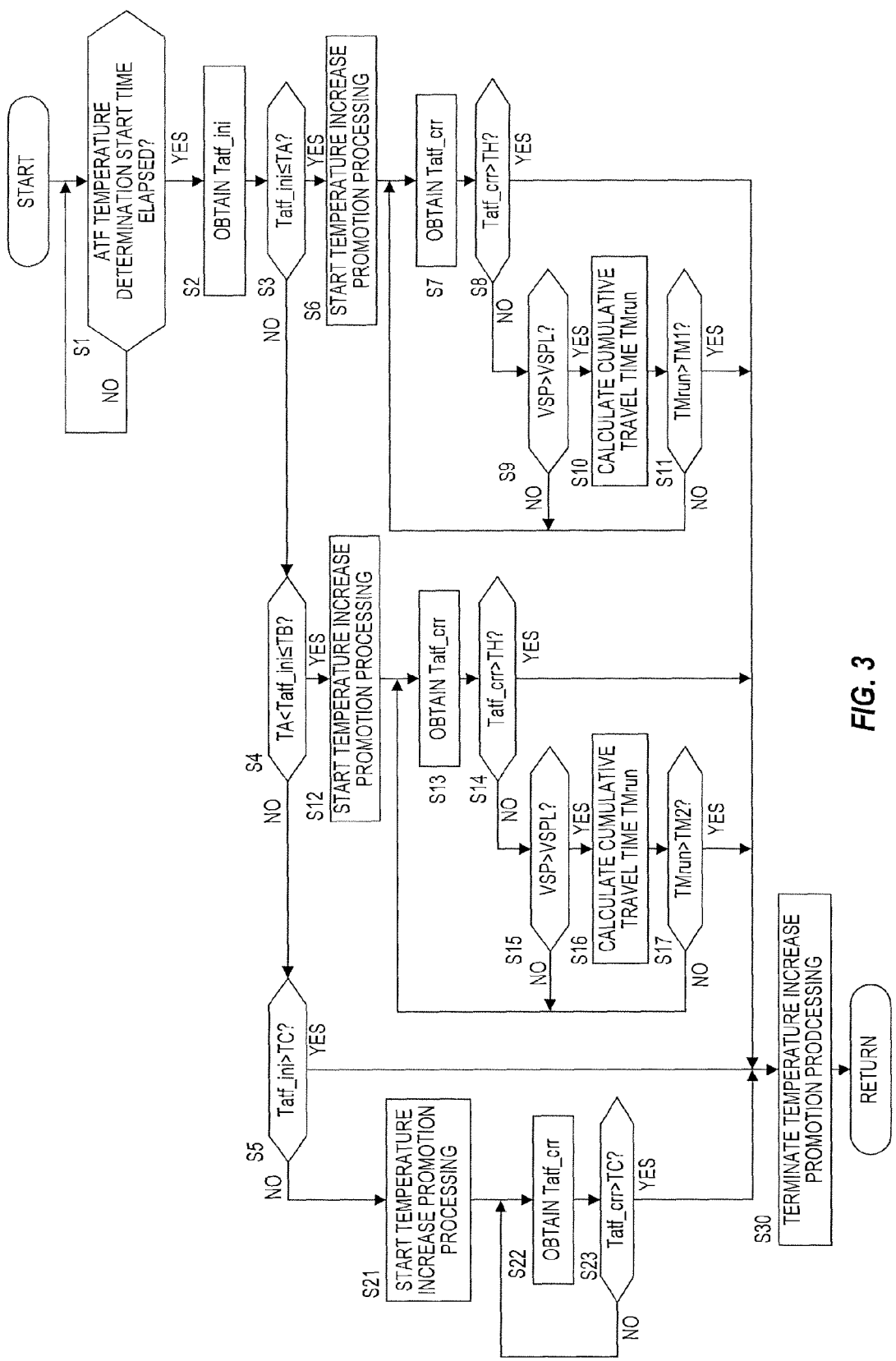
FIG. 3 is a flowchart showing the content of a protection control program executed on the automatic transmission by a transmission control unit.

FIG. 3 is a flowchart showing the content of a protection control program executed on the automatic transmission 20 by the ATCU 32 at a low temperature and an extremely low temperature. This program is stored in the memory of the ATCU 32 and executed by the ATCU 32 when an ignition key of the engine 10 is switched ON. Protection control performed on the automatic transmission 20 at a low temperature and an extremely low temperature will be described below with reference to this flowchart.

First, in S1, the ATCU 32 determines whether or not an elapsed time from a point at which the ignition key was switched ON has reached an ATF temperature determination start time. The ATF temperature determination start time is a period extending from the point at which the ignition key is switched from OFF to ON such that a current is applied to the ATF temperature sensor 45 to a point at which an output signal from the ATF temperature sensor 45 stabilizes, and is set at approximately one second, for example. When the determination is affirmative, the processing advances to S2, and when the determination is negative, the determination of S1 is repeated.

In S2, the ATCU 32 obtains the ATF temperature Tatf detected by the ATF temperature sensor 45. The ATCU 32 stores the ATF temperature Tatf obtained at this time in the memory as an ATF initial temperature Tatf_ini.

In S3 to S5, the ATCU 32 determines a temperature region to which the ATF initial temperature Tatf_ini belongs. In this embodiment, the following four temperature regions (a) to (d) are envisaged as the temperature regions.

(a) First extremely low temperature region (Tatf_ini≤TA)

(b) Second extremely low temperature region, in which temperature is higher than first extremely low temperature region (TA<Tatf_ini≤TB)

(c) Low temperature region (TB<Tatf_ini≤TC)

(d) Normal region (Tatf_ini>TC)

When the ATF initial temperature Tatf_ini is in any of the temperature regions (a) to (c), the ATCU 32 performs the ATF temperature increase promotion processing.

The predetermined temperatures TA, TB are set at temperatures that impair ATF circulation between the ATF cooler 23 and the automatic transmission 20, or in other words temperatures at which the viscosity of the ATF increases to such an extent that the ATF, having increased in viscosity due to the temperature decrease, accumulates in the cooler hoses 25a, 25b and can no longer be supplied to the automatic transmission 20 from the ATF cooler 23 in a sufficient amount for lubricating the automatic transmission 20. ATF circulation is inhibited not only when the ATF solidifies but also when the ATF temperature Tatf approaches a freezing point such that the fluidity of the ATF decreases dramatically, and therefore the predetermined temperatures TA, TB are set at values higher than the freezing point of the ATF. Depending on a low temperature characteristic of the ATF used in the automatic transmission 20 and the capacity of the pump used to circulate the ATF, for example, TA is set at a value between −35° C. and −40° C. and TB is set at a value between −30° C. and −35° C., i.e. a higher value than TA.

The predetermined temperature TC is set at a value having leeway relative to a lower limit value of the ATF temperature Tatf at which the frictional engagement elements can be engaged and disengaged without delays. Depending on the low temperature characteristic of the ATF used in the automatic transmission 20 and the capacity of the pump used to circulate the ATF, for example, TC is set at a value between 35° C. and 45° C.

When, as a result of the determinations of S3 to S5, the ATF initial temperature Tatf_ini is determined to be in the first extremely low temperature region, the processing advances to S6. Further, when the ATF initial temperature Tatf_ini is in the second extremely low temperature region, the processing advances to S12, when the ATF initial temperature Taff_ini is in the low temperature region, the processing advances to S21, and when the ATF initial temperature Tatf_ini is in the normal region, the processing advances to S30.

(a) Temperature Increase Control in the First Extremely Low Temperature Region

In S6 to S11, the ATCU 32 performs protection control in response to an extremely low temperature.

First, in S6, the ATCU 32 starts the ATF temperature increase promotion processing. As the temperature increase promotion processing, the ATCU 32 prohibits lockup and prohibits shifts to a high gear position. Here, the high gear position is a high-speed travel gear position which is equal to or higher than a predetermined gear position and which, when used, causes the rotation speed of the engine 10 to decrease, thereby inhibiting an increase in the ATF temperature. When lockup is prohibited, the ATF continues to be stirred in the torque converter 22, and when shifts to the high gear position are prohibited, the rotation speed Ne of the engine 10 is maintained at a comparatively high speed. As a result, increases in the amount of ATF stir in the torque converter 22 and the rotation speed of the pump for circulating the ATF are achieved, and therefore an increase in the temperature of the ATF can be promoted.

In S7, the ATCU 32 obtains the current ATF temperature Tatf from the ATF temperature sensor 45 and stores the obtained temperature Tatf in the memory as an ATF current temperature Tatf_crr.

In S8, the ATCU 32 determines whether or not the ATF current temperature Taff_crr is higher than an upper limit temperature TH of the ATF. The upper limit temperature TH of the ATF is set at a value having leeway relative to a lower limit temperature value at which a facing (friction material) of the frictional engagement elements deteriorates, for example a value between 90° C. and 100° C. When the ATF current temperature Tatf_crr is higher than the upper limit temperature TH of the ATF, the processing advances to S30, in which the ATF temperature increase promotion processing is terminated, or in other words lockup and shifts to the high gear position are permitted.

When the ATF current temperature Tatf_crr is not higher than the upper limit temperature TH of the ATF, the processing advances to S9 and S10, in which a travel time at or above a predetermined vehicle speed VSPL and a cumulative travel time TMrun are calculated. The predetermined vehicle speed VSPL is set at a vehicle speed at which the temperature of the ATF can be increased even though an outside air temperature is extremely low, for example 15 km/h to 20 km/h. In S10, the ATCU 32 adds only a time during which the vehicle speed VSP exceeded the predetermined vehicle speed VSPL to the cumulative travel time TMrun.

In S11, the ATCU 32 determines whether or not the cumulative travel time TMrun has exceeded a predetermined time TM1. The predetermined time TM1 is set at a time required for the ATF temperature Tatf to rise to a temperature at which ATF circulation between the automatic transmission 20 and the ATF cooler 23 is restored and engagement/disengagement delays do not occur in the frictional engagement elements in a case where the ATF initial temperature Tatf_ini is in the first extremely low temperature region, for example a value between 40 minutes and 50 minutes.

When the cumulative travel time TMrun exceeds the predetermined time TM1, the processing advances to S30, in which the ATCU 32 terminates the temperature increase promotion processing, or in other words permits lockup and shifts to the high gear position. When the cumulative travel time TMrun does not exceed the predetermined time TM1, on the other hand, the processing returns to S7, in which the ATCU 32 continues the ATF temperature increase promotion processing.

Hence, the temperature increase promotion processing for prohibiting lockup and shifts to the high gear position is started when the ATF initial temperature Tatf_ini is in the first extremely low temperature region. The temperature increase promotion processing is then continued until the cumulative travel time TMrun at or above the predetermined vehicle speed VSPL exceeds the predetermined time TM1 or until the ATF current temperature Taff_crr exceeds the ATF upper limit temperature TH.

Following termination of the temperature increase promotion processing, lockup and shifts to all gear positions, including the high gear position, are performed in accordance with the shift map.

(b) Temperature Increase Control in the Second Extremely Low Temperature Region

In S12 to S17, the ATCU 32 performs protection control in response to an extremely low temperature, similarly to S6 to S11, but in this case the ATF initial temperature Tatf_ini is in the second extremely low temperature region, which is higher than the first extremely low temperature region, and therefore the ATF can be raised to the normal region by performing the temperature increase promotion processing for a shorter period than that of the first extremely low temperature region. Hence, a predetermined time TM2 serving as a threshold used in S17 to determine completion of the temperature increase promotion processing is set to be shorter than the predetermined time TM1 used when the ATF temperature Taff is in the first extremely low temperature region, for example at a value between 30 minutes and 40 minutes. All other processing is identical to that of S6 to S11, and therefore detailed description has been omitted.

When the ATF initial temperature Taff_ini is in the second extremely low temperature region, it may also be possible to raise the temperature of the ATF at a lower vehicle speed VSP than that of the first extremely low temperature region, and therefore a predetermined vehicle speed VSPL used in S15 may be set lower than the predetermined vehicle speed VSPL used in S9.

Hence, the temperature increase promotion processing for prohibiting lockup and shifts to the high gear position is started when the ATF initial temperature Tatf_ini is in the second extremely low temperature region and continued until the cumulative travel time TMrun at or above the predetermined vehicle speed VSPL exceeds the predetermined time TM2 (<TM1) or until the ATF current temperature Tatf_crr exceeds the ATF upper limit temperature TH.

Following termination of the temperature increase promotion processing, lockup and shifts to all gear positions, including the high gear position, are performed in accordance with the shift map.

(c) Temperature Increase Control in the Low Temperature Region

When the ATF temperature Taff is higher than the second extremely low temperature region but lower than the predetermined temperature TC, the processing advances to S21. In S21, the ATCU 32 starts the temperature increase promotion processing by prohibiting lockup as the temperature increase promotion processing.

In S22, the ATCU 32 obtains the ATF current temperature Tatf_crr from the ATF temperature sensor 45. In S23, the ATCU 32 determines whether or not the ATF current temperature Tatf_crr has exceeded the predetermined temperature TC so as to enter the normal region. When the ATF current temperature Tatf_crr is in the normal region, the processing advances to S30, in which the ATCU 32 terminates the temperature increase promotion processing, or in other words permits lockup. When the ATF current temperature Taff_crr has not exceeded the predetermined temperature TC, on the other hand, the processing returns to S22, in which ATCU 32 continues the ATF temperature increase promotion processing.

Hence, the ATF temperature increase promotion processing for prohibiting lockup is started when the ATF initial temperature Tatf_ini is in the low temperature region and continued until the ATF current temperature Tatf_crr rises above the predetermined temperature TC.

Following termination of the temperature increase promotion processing, lockup is performed in accordance with the shift map.

Next, actions and effects obtained by executing the aforesaid protection control will be described.

The protection control described above can be broadly divided into extremely low-temperature protection control (S6 to S17), in which ATF having an extremely low temperature and dramatically reduced fluidity accumulates in the cooler hoses 25a, 25b connecting the ATF cooler 23 to the automatic transmission 20 such that the amount of ATF supplied to the automatic transmission 20 from the ATF cooler 23 is insufficient, and low-temperature protection control (S21 to S23), in which the temperature of the ATF is low, albeit not as low as an extremely low temperature, and therefore activation of the frictional engagement elements in the automatic transmission 20 is delayed. The extremely low-temperature protection control is further divided into the protection control performed in the first extremely low temperature region (S6 to S11) and the protection control performed in the second extremely low temperature region (S12 to S17), which are executed selectively in accordance with the ATF initial temperature Tatf_ini.

In all types of protection control, an increase in the temperature of the ATF is promoted by prohibiting lockup as the ATF temperature increase promotion processing (S6, S12, S21). However, the termination condition of the temperature increase promotion processing differs according to the temperature region such that in the low-temperature protection control, the temperature increase promotion processing is performed until the ATF current temperature Tatf_crr rises above the predetermined temperature TC (S23), whereas in the protection control performed in the first or second extremely low temperature region, the temperature increase promotion processing is continued for a predetermined time (S11, S17).

The reason for this is as follows. At an extremely low temperature, the ATF does not circulate between the ATF cooler 23 and the automatic transmission 20 and only the temperature of the ATF in the automatic transmission 20 increases. Therefore, if completion of the temperature increase promotion processing is determined on the basis of the ATF current temperature Tatf_crr detected by the ATF temperature sensor 45, the temperature increase promotion processing is determined to be complete even though the temperature of the ATF in the ATF cooler 23 and the cooler hoses 25a, 25b has not risen. As a result, the automatic transmission 20 may be insufficiently lubricated, leading to seizure and breakage of the frictional engagement elements and rotary elements.

In the protection control described above, completion of the temperature increase promotion processing at an extremely low temperature is determined on the basis of the duration of the temperature increase promotion processing, and therefore the temperature increase promotion processing can be performed for the required time even at an extremely low temperature. As a result, insufficient lubrication of the automatic transmission 20, and accordingly seizure and breakage of the frictional engagement elements and rotary elements caused thereby, can be prevented.

In the protection control described above, the cumulative amount of time that the vehicle installed with the automatic transmission 20 has traveled at or above the predetermined vehicle speed VSPL at which the ATF temperature can be raised is used as the duration of the temperature increase promotion processing, and the temperature increase promotion processing is terminated when the cumulative time reaches the predetermined time TM1, TM2 (S9 to S11, S15 to S17). Hence, the extent to which the ATF temperature has been raised by the temperature increase promotion processing can be grasped precisely, and as a result, completion of the temperature increase promotion processing can be determined more appropriately. The cumulative amount of time that the vehicle speed VSP is equal to or higher than the predetermined vehicle speed VSPL is used here to determine completion, but the amount of time that the rotation speed Ne of the engine 10 or the input rotation speed Ni of the automatic transmission 20 equals or exceeds a predetermined rotation speed may be accumulated and used to determine completion instead of the vehicle speed VSP.

The reason for dividing the extremely low-temperature control into the protection control performed in the first extremely low temperature region (S6 to S11) and the protection control performed in the second extremely low temperature region (S12 to S17) and differentiating between the predetermined times TM1, TM2 used to determine completion is that in the same extremely low temperature region, the time required to raise the ATF temperature increases as the ATF initial temperature Tatf_ini falls. By extending the predetermined time used to determine completion of the temperature increase promotion processing as the ATF initial temperature Tatf_ini falls (TM1>TM2), completion of the temperature increase promotion processing can be determined more appropriately. Here, the extremely low temperature region is divided into two regions and TM1, TM2 are set as the predetermined times used to determine completion in accordance with the region. However, the extremely low temperature region may be divided into three or more regions and narrower predetermined times may be used to determine completion. Alternatively, instead of dividing the extremely low temperature region, a predetermined time may be calculated from the ATF initial temperature Tatf_ini using a formula, a table, or similar.

When the automatic transmission 20 includes the torque converter 22 having the lockup clutch 221, as in this embodiment, the temperature increase promotion processing is preferably performed by prohibiting lockup, as in the protection control described above (S6, S12, S21). In so doing, the ATF continues to be stirred in the torque converter 22, and as a result, an increase in the temperature of the ATF can be promoted. At an extremely low temperature, shifts to the high gear position are preferably also prohibited as the temperature increase promotion processing (S6, S12). In so doing, the rotation speed Ne of the engine 10 is maintained at a higher speed than that of a case in which shifts to the high gear position are not prohibited, and therefore increases in the amount of ATF stir and the rotation speed of the pump for circulating the ATF can be achieved, thereby promoting an increase in the temperature of the ATF. In this embodiment, both lockup and shifts to the high gear position are prohibited at an extremely low temperature, but either of these may be prohibited. At a low temperature, only lockup is prohibited, but shifts to the high gear position may also be prohibited, or shifts to the high gear position may be prohibited instead of lockup.

At an extremely low temperature, the ATF does not circulate between the ATF cooler 23 and the automatic transmission 20 and only the temperature of the ATF in the automatic transmission 20 increases. Therefore, the ATF temperature may rise to the upper limit temperature TH at which the facing (friction material) of the frictional engagement elements in the automatic transmission 20 deteriorates. In the protection control described above, when the temperature increase promotion processing is underway in such a case, the temperature increase promotion processing is terminated (S8→S30, S14→S30), and therefore the ATF temperature does not rise above the upper limit temperature TH. Thus, the facing of the frictional engagement elements can be prevented from deteriorating.

An embodiment of this invention was described above, but the above embodiment merely illustrates an example of an application of this invention, and the technical scope of this invention is not limited to the specific constitutions of the above embodiment.

For example, in the above embodiment, the automatic transmission 20 is described as being a step automatic transmission, but the automatic transmission 20 is not limited to a step automatic transmission and may be a continuously variable transmission employing a belt CVT, a chain CVT a toroidal CVT, and so on. In this case, instead of prohibiting shifts to a high gear position as the ATF temperature increase promotion processing, shifts to a speed ratio that is equal to or smaller than a predetermined high side speed ratio may be prohibited.

This application claims priority based on Japanese Patent Application No. 2009-246484, filed with the Japan Patent Office on Oct. 27, 2009, the entire content of which is incorporated into this specification by reference.

What is claimed is:

1. An automatic transmission that has a heat exchanger for cooling a working oil and receives a supply of the working oil from the heat exchanger, comprising:
    a working oil temperature sensor that is configured to obtain a temperature of the working oil in the automatic transmission;
    a temperature increase promotion processing starting unit which is configured to start a temperature increase promotion processing that promotes an increase in the temperature of the working oil when:
    an initial value of the temperature of the working oil obtained by the working oil temperature sensor is in a low temperature region, in which a viscosity of the working oil rises such that activation of a frictional engagement element in the automatic transmission is delayed, and
    the initial value of the temperature of the working oil is in an extremely low temperature region that is a lower temperature region than the low temperature region, in which the viscosity of the working oil rises further such that the working oil is not supplied sufficiently from the heat exchanger to the automatic transmission; and
    a temperature increase promotion processing terminating unit which is configured to:
    determine whether the temperature increase promotion processing is complete on a basis of a current temperature of the working oil obtained by the working oil temperature sensor in a case where the temperature increase promotion processing is started while the initial value of the temperature of the working oil is in the low temperature region,
    determine whether the temperature increase promotion processing is complete on a basis of a duration of the temperature increase promotion processing in a case where the temperature increase promotion processing is started while the initial value of the temperature of the working oil is in the extremely low temperature region, and
    terminate the temperature increase promotion processing when the temperature increase promotion processing is determined to he complete.

2. The automatic transmission as defined in claim 1, wherein the duration of the temperature increase promotion processing is a cumulative amount of time that a vehicle installed with the automatic transmission has traveled at a vehicle speed that is equal to or higher than a vehicle speed at which the temperature of the working oil can be raised.

3. The automatic transmission as defined in claim 1, wherein, in the case where the temperature increase promotion processing is started while the initial value of the temperature of the working oil is in the extremely low temperature region, the temperature increase promotion processing terminating unit is configured to determine that the temperature increase promotion processing is complete when the duration of the temperature increase promotion processing exceeds a predetermined time, and
    wherein the predetermined time is set to be longer as the initial value of the temperature of the working oil decreases.

4. The automatic transmission as defined in claim 1, wherein the automatic transmission comprises a torque converter having a lockup clutch, and
    wherein the torque converter is configured such that, in the temperature increase promotion processing, engagement of the lockup clutch is prohibited.

5. The automatic transmission as defined in claim 1, wherein the automatic transmission is a step automatic transmission having a plurality of gear positions, and
    wherein the automatic transmission is configured such that, in the temperature increase promotion processing, a shift to a gear position that is equal to or higher than a predetermined gear position of the automatic transmission is prohibited.

6. The automatic transmission as defined in claim 1, wherein, when the current temperature of the working oil obtained by the working oil temperature sensor exceeds an upper limit temperature of the working oil while the temperature increase promotion processing is underway, the temperature increase promotion processing terminating unit is configured to terminate the temperature increase promotion processing.

* * * * *